United States Patent

Morton

[15] 3,662,096

[45] May 9, 1972

[54] ELECTRONIC PHASING AND SYNCHRONIZING CIRCUIT FOR FACSIMILE RECORDERS

[72] Inventor: Scott D. Morton, Reseda, Calif.

[73] Assignee: The United States of America as represented by the Secretary of the Navy

[22] Filed: July 8, 1970

[21] Appl. No.: 53,046

[52] U.S. Cl. ........................................178/7.3 S, 178/69.5 F
[51] Int. Cl. ........................................................H04n 1/36
[58] Field of Search ...............178/69.5 F, 7.3 S, 7.5 S, 6.7 R; 307/234; 328/112, 139; 329/166

[56] References Cited

UNITED STATES PATENTS 2,798,116 7/1957 Wiens ................................178/6.7 R
2,866,896 12/1958 Stampfl.................................328/112

OTHER PUBLICATIONS

" Full- Wave Tunnel Diode Rectifier- Demodulator," G. E. Simaitis et al., IBM Tech. Disclosure Bulletin, Vol. 4, No. 10, Page 62, March 1962.

*Primary Examiner*—Robert L. Richardson
*Assistant Examiner*—George G. Stellar
*Attorney*—R. S. Sciascia, George J. Rubens and J. W. McLaren

[57] ABSTRACT

In a facsimile recording system for recording facsimile video signals, apparatus for detecting a phasing bar received at the beginning of each line of said facsimile video signals. Modulated carrier facsimile video signals are demodulated. A magnitude detector senses the magnitude of the demodulated facsimile video signals and produces an output when the magnitude of the demodulated signals substantially equals the known magnitude of the phasing bar. A bar width detector functions in response to the output of the magnitude detector to produce an output when the pulse width of the demodulated signals substantially equals the known pulse width of the phasing bar.

1 Claims, 2 Drawing Figures

INVENTOR.
SCOTT D. MORTON
BY
George J. Rubens
ATTORNEYS

INVENTOR.
SCOTT D. MORTON
BY
ATTORNEYS

ELECTRONIC PHASING AND SYNCHRONIZING CIRCUIT FOR FACSIMILE RECORDERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In several present day facsimile operations, such as those encountered in automatic picture transmissions from satellites to earth, a phasing bar (i.e., pulse) is included at the beginning of each line of facsimile video signals. As is known to those skilled-in-the-art phasing bars are used to achieve proper phasing which is critical for good quality pictures to be reproduced on facsimile recorders. In existing facsimile equipment, phasing is achieved by means of a phasing sequence at the beginning of each picture. This method has an obvious disadvantage in that if reception is commenced during a part of a picture, the remainder of that picture will not be phased. Since a satellite pass results in only approximately three usable pictures, it can be readily appreciated that the loss of one picture due to incorrect phasing can be very significant. Thus the need for a phasing circuit with which phasing can be achieved at any point in a picture is apparent.

Furthermore, most satellite pictures are currently reproduced on electrolytic or wet bath photographic facsimile recorders. However, the use of cathode ray tube photorecorders is currently being considered for use as satellite picture facsimile recorders since they have many advantages over the afore-mentioned facsimile recorders. Existing phasing circuits were designed for use only with the afore-mentioned facsimile recorders and hence are not compatible with cathode ray tube photorecorders which require a sweep rate that is both in synchronization and in phase with received facsimile video signals, i.e., the sweep signal must run at a correct rate and it must retrace at the end of a line of picture.

Consequently the need for a phasing circuit which can be used for recording satellite facsimile video signals on cathode ray tube photorecorders is likewise apparent.

The novel phasing circuit disclosed herein can be used to achieve proper phasing (i.e., retrace timing) of facsimile video signals on cathode ray tube photorecorders and furthermore can be used to achieve phasing during any part of a picture.

SUMMARY OF THE INVENTION

A phasing circuit for use with facsimile recording systems is disclosed. The circuit can be especially used to advantage to record satellite facsimile video signals on cathode ray tube (CRT) photorecorders which require a sweep rate which is both in sync and in phase with the facsimile video signals being recorded. The phasing circuit detects a phasing bar having a predetermined height and width which is received at the beginning of each line of the facsimile video signals. The phasing bar is essentially used to ensure that each line of the picture being recorded is in alignment with the other line, i.e., the picture is not skewed. The phasing bars are distinguishable from the remainder of the facsimile signal since they are transmitted at the largest amplitude, which amplitude represents maximum white. It is possible, however, for portions of the picture being recorded to have maximum white areas in them, and thus steps must be taken to ensure that maximum white video signals are not mistaken for phasing bars by the phasing circuitry. The signals are demodulated and applied to a pulse height detector which produces an output only when the magnitude of the demodulated signals substantially equals the known height (amplitude) of the phasing bars. A pulse width detector functions in response to the output of the pulse height detector to produce an output when the pulse width of the demodulated signals equals the known width of the phasing bars. Thus the phasing bars can be detected during the picture portion of a transmission, and phasing can be achieved at any point in a picture. A sweep sawtooth is digitally synthesized from the signal subcarrier to assure proper synchronization, and the output of the phasing pulse detectors is used to reset the sweep to achieve proper phasing.

DESCRIPTION OF THE PREFERRED EMBODIMENT

Figure 1:
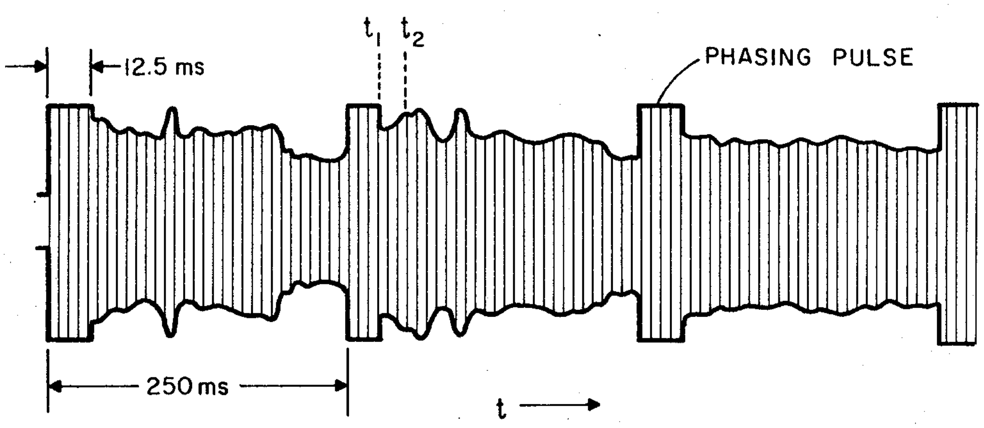
FIG. 1 is a graphical representation of a typical modulated carrier facsimile video signal of the type used in satellite facsimile systems.

Before beginning a detailed discussion of the invention, the nature of the facsimile signal of FIG. 1 should first be understood. The most common satellite facsimile systems use a 2,400 c.p.s. subcarrier modulated by the video information. The maximum amplitude video signal represents white and a minimum amplitude black. A complete picture comprises 800 lines of video, each being 250 milliseconds in duration. At the beginning of each line, a 12.5 millisecond phasing bar (pulse) is transmitted. As mentioned above the phasing bar has a magnitude analogous to a maximum white video signal and a predetermined pulse width.

It should be understood that the above-mentioned frequencies, and bar amplitude and width are merely illustrative and do not limit the breadth of the invention in any way. It should also be understood that the facsimile signals may be received directly from the output of some form of radio receiver, wire line, tape recorder, or any other suitable source.

As previously mentioned if it is desired to use a CRT photorecorder to record facsimile video signals, such as those transmitted from a satellite to earth and as shown in FIG. 1, a phasing circuit is required which can supply a sweep rate to the photorecorder which is both in sync and in phase with the video signals.

Figure 2:
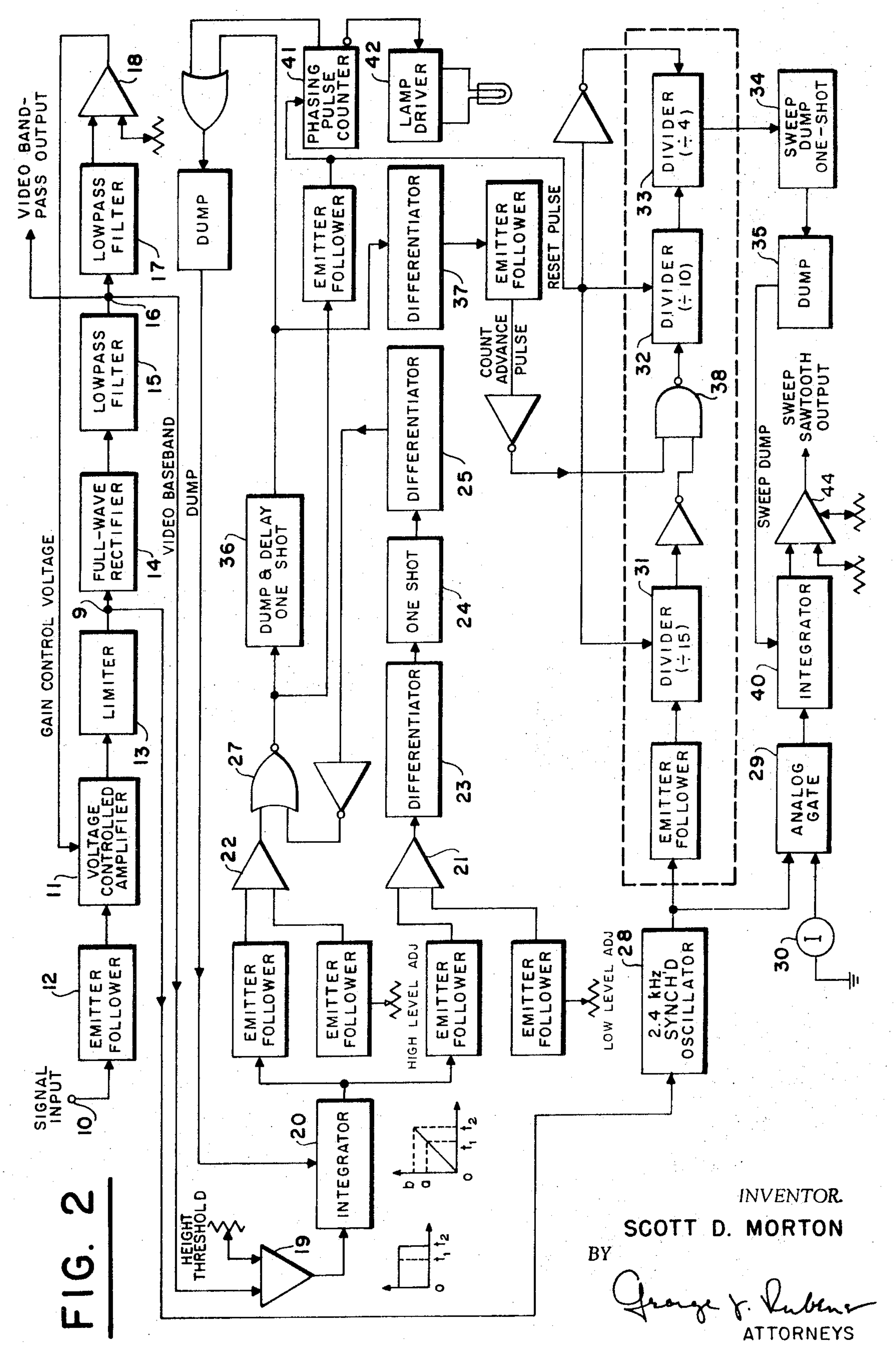
FIG. 2 is a schematic block diagram of a phasing circuit embodying the novel inventive concept disclosed herein.

FIG. 2 is a schematic block diagram of an electronic phasing and synchronizing circuit embodying the inventive concept disclosed herein.

In FIG. 2 an amplitude modulated carrier facsimile video signal as shown in FIG. 1 is coupled to an input terminal 10. As previously mentioned this signal can be supplied from either a radio receiver, wire line, tape recorder, or any other suitable source. Since the signal levels from these various sources will not be the same and will normally vary with time, incoming video signals are first processed through an automatic gain control stage.

It can be seen from FIG. 2 that the signal is fed to a voltage controlled amplifier 11 through an input emitter follower 12. The voltage controlled amplifier 11 can comprise, for example, a 3N140 dual gate MOSFET. The input signal is applied to a first gate and the automatic gain control error voltage is applied to a second gate to thereby vary the gain.

The signal is then fed to a limiter 13 which is adjusted to clip at a threshold level slightly above the maximum white level. The output signal is coupled to a demodulator comprising a full wave rectifier 14 and a low-pass filter 15. The demodulator functions to detect the video signal from the modulated carrier. Thus the video baseband signal present at terminal 16 comprises pure video information. This video baseband signal can be fed to a video amplifier (not shown), in the CRT photorecorder.

The video baseband signal is also fed to an automatic gain control comparator 18. The DC bias of the comparator is selectively adjusted such that the comparator responds only to an input signal magnitude substantially equal to the maximum white level. After the gain control voltage output of the comparator is filtered to remove ripple and switching transients, it is applied to a second gate of the voltage controlled amplifier 11. The automatic gain control circuit described above essentially comprises a peak detecting automatic gain control circuit which maintains a constant phasing bar level. A peak detecting circuit is necessary since with an RMS or other averaging type of detector, the automatic gain control circuit would correct against the gray scales which are usually present in satellite facsimile video signals.

Due to the action of the automatic gain control circuit the video baseband signal at terminal 16 contains phasing bars having essentially constant amplitude (i.e., magnitude). The video baseband from terminal 16 is fed to a comparator 19 which essentially comprises a bar height detector. Comparator 19 is selectively adjusted to produce an output only when the baseband signal magnitude, i.e., height, is substantially equal to the maximum white level. Thus it can be seen that this portion of the circuit of FIG. 2 functions to detect the phasing bar height.

The output of the phasing bar height detector 19 is coupled to an integrator 20. It should be noted that detector 19 produces a pulsed output since the detector 19 is switched on when the magnitude of the video baseband signal is equal to the maximum white level and the detector is switched off when the signal is below the maximum white level. Integrator 20 functions to integrate the output of detector 19 to thereby produce an output having a magnitude level which increases directly as the width of the pulse output of detector 19. That is, as shown in FIG. 2, if the output pulse has a pulse width equal to $t_2$—$t_1$, the output of the integrator 20 has a magnitude of $a$ at time $t$, and $b$ at time $t_2$. The output of integrator 20 is fed to two comparators 21 and 22 which essentially comprise pulse width detectors. The first comparator or low level detector 21 is selectively adjusted to produce an output only when the level of the output of integrator 20 reaches a selectively predetermined level such as $a$ which corresponds to a phasing bar pulse width of $t_1$. The second comparator or high level detector 22 is likewise selectively adjusted to produce an output only when the level of the output of integrator 20 reaches a selectively predetermined level such as $b$ which corresponds to a phasing bar pulse width of $t_2$.

If, for example, the phasing bar has a pulse width of 12.5 ms as shown in FIG. 1, $t_1$ can arbitrarily set at 12 ms and $t_2$ at 13 ms. Thus the integrator 20 and low and high level detectors 21 and 22 function to detect the phasing bar pulse width so that maximum white video signals detected by height detector 19 are positively and automatically identified as phasing bars.

If $t_1$ is set at a value of 12 ms and $t_2$ at 13 ms, the outputs of the two comparators will occur 1 ms apart. Therefore the output of comparator 21 must be delayed before it can be compared to the output of comparator 22. The necessary delay is accomplished in the following manner. The pulse output of comparator 21 is fed to the differentiator 23 thereby producing a spike at the output of the differentiator. The resulting spike triggers a one-shot multivibrator 24 whenever the detector 21 is switched on. The pulse output of the one-shot is differentiated by differentiator 25 and rectified half-wave such that only the negative going pulse generated when the one-shot is triggered appears. This pulse is then level shifted in a positive direction by, for example, 4 volts. The result is an output signal having a positive logic level which is "one" normally and which contains a short "zero" pulse whenever a bar having a pulse width greater than $t_1$ of 12 ms is detected by the height detector 19.

The resulting output signal is then fed to a NOR gate 27 simultaneously with the output of the level detector 22. The output of the NOR gate is a logic "one" if the pulse width of the incoming bar is between 12 ms and 13 ms, and a logic "-zero" if the pulse width of the incoming bar is not between 12 ms and 13 ms. The logic "one" is produced 13 ms after the start of the phasing bar. Since the pulse width of the phasing bar is only 12.5 ms, the output pulse indicating its presence is generated 0.5 ms after the bar has ended. To correct for this time delay a count advance pulse is generated in a manner to be described hereinafter.

The required sweep signal is derived digitally in a novel manner from the 2.4 KHz subcarrier previously described. The composite facsimile video signal at terminal 9 is fed to a 2.4 KHz oscillator 28 to thereby synchronize the oscillator. The oscillator provides a 2.4 KHz square wave from which the sweep is generated. The square wave is coupled through an analog gate 29 to a constant current source 30. The square wave gates the source 30 on and off, and by charging a capacitor, a linear ramp is thereby generated in a stepwise manner.

The output frequency, F of the oscillator 28 is also coupled to a divider circuit comprising dividers 31, 32, and 33. The divider circuit functions to divide the output by 600, for example, to thereby obtain the required 4 Hz sweep rate at the output of the sweep amplifier 44. The output of the divider circuit is fed to a one-shot multivibrator 34 which triggers the dump circuit 35 to thereby retrace the sweep. In effect, the sweep ramp function rises for 600 cycles and is then dumped by a one-shot 34. Hence the sweep is directly related in rate to the 2.4 KHz subcarrier with 600 cycles of subcarrier generating one sweep cycle.

The remaining step in the operation of the circuit comprises resetting the sweep so that it will begin in step with the phasing bars in the facsimile video signals as shown in FIG. 1. This resetting is accomplished by using the phasing pulse generated at the output of NOR gate 27 by the phasing bar detector circuitry to reset the sweep divider and dump the sweep integrator in the following manner.

The sweep divider essentially comprises two sections. The first section divides by fifteen and the second divides by forty. Two section division is required because, as mentioned previously, the phasing bar is not detected until 0.5 ms after it has occurred. To remedy this situation the phasing pulse at the output of NOR gate 27 which is generated when a phasing bar is detected is fed to a one-shot multivibrator 36. The output of the multivibrator is differentiated by differentiator 37 and half-way rectified to thereby produce a count advance or time-delayed pulse.

The pulse output from NOR gate 27 is also coupled to the entire divider circuit. The pulse resets the divider circuit such that the output of the divider circuit is in the "one" state. The next cycle of the 2.4 KHz oscillator 28 then operates to change the output of the divider to a "zero" state. This change in logic level triggers the one-shot 34 and thereby dumps the sweep integrator 40.

The count advance pulse, which has been delayed up to this time, then is fed into the input of the divider 32 by means of a NAND gate 38 which has both inputs inverted. The NAND gate thereby performs an "OR" function on the count advance pulse and on the output of the divider 31. The count advance pulse thus advances the count by an amount equal to fifteen serial bits from the 2.4 KHz oscillator. As a result, the first line of picture after the phasing bar has been detected is 585 cycles of 2.4 KHz instead of 600 cycles in length. Consequently, thereafter the sweep retraces in the middle of the phasing bar.

It should be noted that the phasing bar is detected only twice. Thereafter the sweep and video are assumed to be in phase. A counter 41 can be used to count the pulses which are generated by NOR gate 27 when a phasing bar is detected. Furthermore each time a phasing bar is detected, the width detection integrator 20 is dumped to allow for detection of the next pulse. The counter 41 can be reset manually by means of a conventional push button switch (not shown). After the counter counts two detected pulses it dumps the integrator 20 which is used to detect the phasing bar width. Hence no more bars are detected. The dump lasts until the reset button is pushed to thereby initiate the phasing action. An indicator lamp 42 can be used to indicate that the phasing sequence is in effect.

Thus it can be seen that a new and novel facsimile video signal phasing circuit has been disclosed having the ability to detect phasing bars in the picture portion of facsimile video signal transmissions thereby allowing phasing to be accomplished at any point in a picture. Phasing bar height and width detection means allow detection of the bar in the presence of video data by confirming the height and width of the bar.

Obviously many modifications and variations of the present invention are possible in the light of the above teachings. It is therefore to be understood that within the scope of the appended claims the invention may be practiced otherwise than as specifically described.

What is claimed is:

1. In a system for recording received facsimile video signals transmitted from satellites, apparatus for generating a sweep signal which is in synchronism and in phase with said facsimile video signals, said facsimile video signals comprising a video baseband signal amplitude modulated onto a subcarrier signal, having a frequency F, said facsimile video signals having a phasing bar at the beginning of each line thereof, said phasing bar having an amplitude substantially equal to maximum white with respect to said video baseband signal and having a selectively predetermined pulsewidth greater than $t_1$ but less than $t_2$ where $t_1$ and $t_2$ are measured from zero, said apparatus comprising, input terminal means for receiving said facsimile video signals, automatic gain control means connected to said input terminal means for maintaining said phasing bar amplitude substantially constant, demodulator means for receiving said facsimile video signals having gain-controlled phasing bars and for producing said video baseband signals, video recorder means for receiving said video baseband signals, first amplitude threshold means for receiving said video baseband signals and for producing an output pulse when the amplitude of said video baseband signals is substantially equal to said phasing bar amplitude and having a width substantially equal to the time said amplitudes are equal, integrator means for receiving said output pulse and for producing a width detection signal having a magnitude which increases linearly with respect to time, first comparator means for receiving said width detection signal and for producing a first logic signal when the magnitude of said width detection signal corresponds to a width substantially equal to said $t_1$, second comparator means for receiving said width detection signal and for producing a second logic signal when the magnitude of said width detection signal corresponds to a width substantially equal to said $t_2$, said first and second logic signals being of like polarity, first pulse delay means for receiving said first logic signal and for producing a time-delayed first logic signal having a delay time, with respect to said second logic signal, equal to $t_2-t_1$, logic gate means for receiving said time-delayed first logic signal and said second logic signal and for producing a phasing pulse when both of said signals are received thereby indicating the presence of said phasing bar in said video baseband signals, second pulse delay means for receiving said phasing pulse and for producing a time-delayed phasing pulse having a delay time substantially equal to one-half the pulsewidth of said phasing bar, first dump circuit means for receiving said time-delayed phasing pulse and for dumping said integrater means each time said phasing bar is received, oscillator means for receiving said subcarrier and being responsive thereto to produce a square-wave output having the same frequency as said subcarrier, sweep generator means for receiving said square-wave output and for producing a linear ramp sweep output in response thereto, frequency divider means for receiving said square-wave output and for producing a divided frequency output at a rate equal to F/N, where N=1, 2, 3, - - - , second dump circuit means for receiving said divided frequency output and for dumping said sweep generator means at said divided frequency output rate, whereby said sweep output rate is substantially equal to F/N; and, said frequency divider means further including means for receiving said phasing pulse and for re-setting said sweep generator means whereby said sweep output is in phase with said phasing bar and further including means for receiving said time-delayed phasing pulse whereby said sweep output is in phase substantially with the middle of said phasing bar.

* * * * *